Patented Jan. 8, 1924.

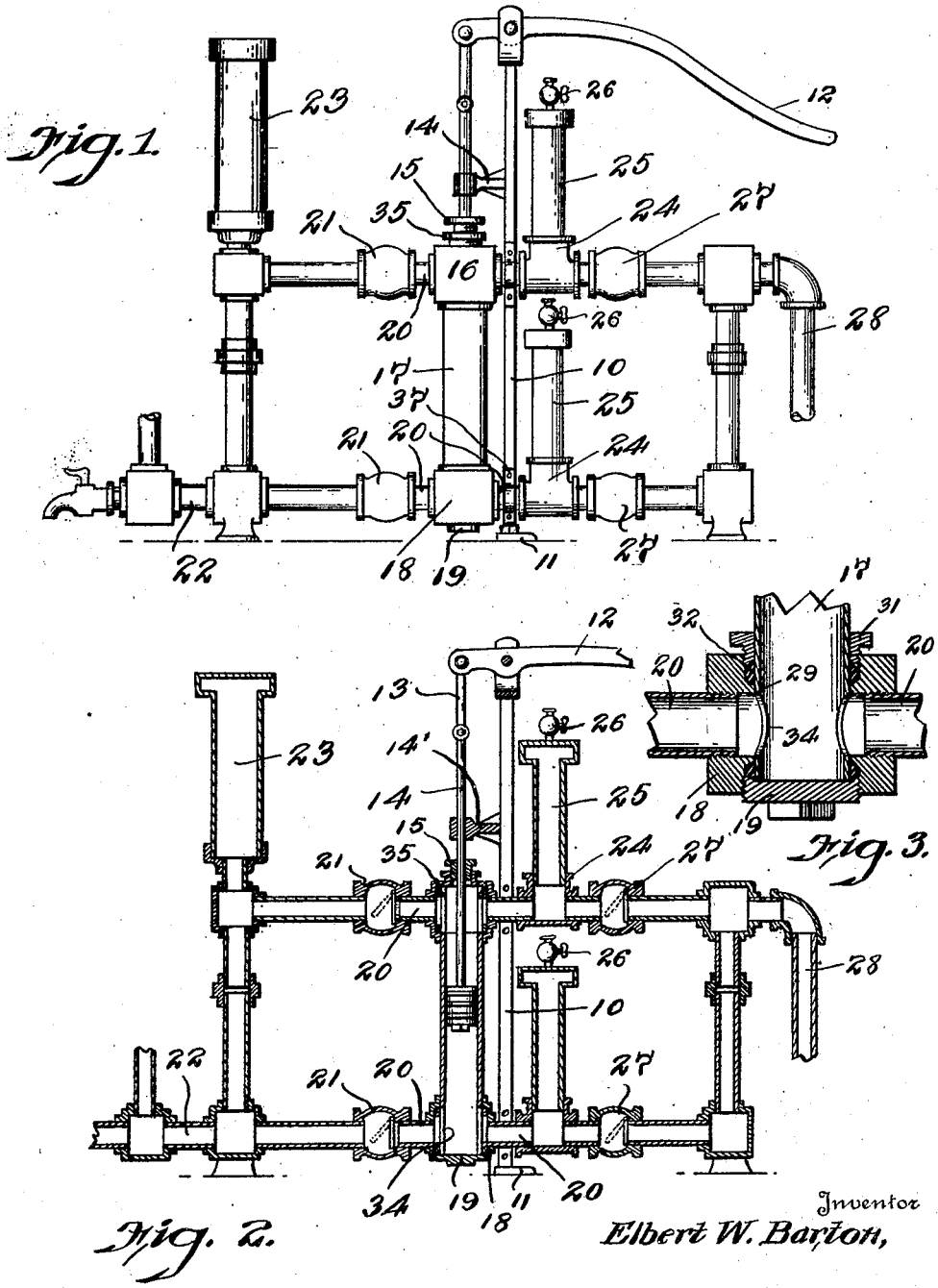

1,479,782

UNITED STATES PATENT OFFICE.

ELBERT W. BARTON, OF BINGHAMTON, NEW YORK.

PUMP.

Application filed August 24, 1921. Serial No. 494,997.

*To all whom it may concern:*

Be it known that I, ELBERT W. BARTON, a citizen of the United States, residing at Binghamton, in the county of Broome and State of New York, have invented certain new and useful Improvements in Pumps, of which the following is a specification.

The invention has for an object to effect improvements in pumps, and particularly aims to simplify the assembly, and replacement of parts. A further important aim of the invention is to enable the construction of such a pump in an economical manner.

Additional objects, advantages and features of the invention will appear from the construction, arrangement and combination of parts hereinafter described and shown in the drawings, wherein, Figure 1 is an elevational view of a combined suction and force pump, double acting, constructed in accordance with my invention.

Fig. 2 is a sectional view thereof.

Fig. 3 is an enlarged detail of the lower portion of the cylinder fitting.

There is illustrated a pump which comprises a standard 10, mounted upon a suitable base 11, and having pivoted at its upper end a usual form of lever 12 for operating the pump. This lever is furcated at the short end and has connected thereto a link 13 pivoted upon the upper end of the pump rod 14, which reciprocates in a guide 14' on the standard, and has familiar form of gland 15 mounted upon the cylinder head fitting 16 of a pump cylinder 17 upon which a bottom fitting 18 is provided, similar to the one 16 with the exception that in place of the gland 15 a bottom cap 19 is screwed into the fitting. The fittings 16 and 18 have threaded openings at the sides for customary pipe connections, nipples 20 being screwed thereinto at opposite sides, in each instance, as shown in the present case. Upon the nipple 20 on the left of the pump, valves 21 are mounted, opening outwardly, and from these in turn, connections are made with the delivery line 22 which may be of any desired character. Preferably an air chamber 23 is incorporated in these connections closely adjacent and outwardly of the valves 21. The nipples 20 at the right hand side of the pump have connected thereto T-fittings 24 with the side openings directed upwardly and having headed cylinders 25 screwed thereinto, these cylinders being in the nature of auxiliary air and vacuum chambers, combined, and having a capacity considerably less than that required in the ordinary air chamber in such locations as indicated at 23. The caps of the cylinders 25 are provided with cocks 26. Immediately outward of the T-fittings 24, check valves 27 are incorporated opening toward the pump, this being the inlet side. A feed pipe 28 is suitably connected to deliver water through the valves 27 freely.

The fittings 15 and 18 are identical each being somewhat in the form of a cross-T, but being fitted at their inner sides to receive the pump cylinder 17 slidably, as shown at 29 in Fig. 3. A packing recess 30 is formed in the outer part of the opening 29 receiving a gland 31 by which a packing 23 is compressed against the cylinder after the latter has been put in place. The openings at the outer sides of the fittings 15 and 18 are each of a size slightly larger than the cylinder, so that the cylinder may be passed therethrough at times, as hereinafter indicated. As before stated, a plain cap 19 is screwed into the outer opening of the lower fitting 18, this cap bearing against the lower end of the cylinder 17, which is notched in alinement with the inlet and outlet ports with which the nipples 20 are entered, and a packing box 35 with the gland 15 before mentioned screwed into the outer opening of the upper fitting 16, this packing box also bearing against the upper end of the cylinder, which is notched the same as the bottom end. The rod 14 is provided with a piston 36 of a usual form. The piston may have a full stroke movement close to the cap 19 or the packing box 35, with perfect safety, owing to the notched ends of the cylinder, by which water may be discharged in advance of the piston at all positions.

In order to remove the cylinder 15 for renewal or other reasons, it is only necessary to loosen the gland 31 and remove either the cap 19 or the packing box 35 in order to withdraw the cylinder. In case it is necessary to lift the cylinder through the upper fitting 16, the guide 14' for the pump rod, and the rod also should be removed.

The standard 10 has straps 37 engaged around the nipples 20 at one side of the cylinder, whereby the parts are supported and held in proper relation.

What is claimed:—

In a pump for liquids, a cylinder mounting including end fittings fixedly connected, a cylinder mounted therein in removable inserted relation, at least one of the fittings having an opening therethrough receiving the cylinder slidably therethrough, a cap member screwed into the outer side of the opening and against the end of the cylinder for retention and support thereof, a lateral conduit connection being provided on the fitting, communication being formed between the connection and the interior of the cylinder.

In testimony whereof I have affixed my signature in presence of two witnesses.

ELBERT W. BARTON.

Witnesses:
 SHERMAN PEER,
 C. A. IVES.